(12) United States Patent
Ahn et al.

(10) Patent No.: US 10,993,232 B2
(45) Date of Patent: Apr. 27, 2021

(54) APPARATUS AND METHOD FOR CHANNEL FEEDBACK IN WIRELESS COMMUNICATION SYSTEM

(71) Applicant: Samsung Electronics Co., Ltd., Suwon-si (KR)

(72) Inventors: Seok-Ki Ahn, Suwon-si (KR); Sungho Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/110,502

(22) Filed: Aug. 23, 2018

(65) Prior Publication Data
US 2019/0069295 A1    Feb. 28, 2019

(30) Foreign Application Priority Data
Aug. 25, 2017 (KR) .................. 10-2017-0107719

(51) Int. Cl.
*H04W 72/04* (2009.01)
*H04B 7/06* (2006.01)
(Continued)

(52) U.S. Cl.
CPC ...... *H04W 72/0453* (2013.01); *H04B 7/0486* (2013.01); *H04B 7/0621* (2013.01);
(Continued)

(58) Field of Classification Search
CPC ...... H04B 7/04; H04B 7/0413; H04B 7/0621; H04B 7/0626; H04B 1/06; H04B 7/0486;
(Continued)

(56) References Cited

U.S. PATENT DOCUMENTS

| 2008/0316099 | A1* | 12/2008 | Fujii | .................. H04B 7/0452 |
| | | | | 342/373 |
| 2011/0003607 | A1* | 1/2011 | Forenza | ............... H04B 7/0626 |
| | | | | 455/501 |

(Continued)

FOREIGN PATENT DOCUMENTS

| KR | 10-2017-0121444 A | 11/2017 |
| KR | 10-2017-0127810 A | 11/2017 |
| KR | 10-2018-0091503 A | 8/2018 |

OTHER PUBLICATIONS

Integer-Forcing Linear Receivers—Jiening Zhan, Bobok Nazer 2014 (Year: 2014).*

(Continued)

*Primary Examiner* — Jeffrey M Rutkowski
*Assistant Examiner* — Sudesh M Patidar
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long-Term Evolution (LTE). According to various embodiments of the present disclosure, a first apparatus in a wireless communication system that includes at least one processor and at least one transceiver operatively coupled with the at least one processor. The at least one processor is configured to obtain a channel matrix based on a signal received from a second apparatus, obtain an integer matrix for integer forcing (IF) based on the channel matrix, and generate channel information based on the integer matrix. The at least one transceiver is configured to transmit the generated channel information to the second apparatus.

12 Claims, 11 Drawing Sheets

(51) Int. Cl.
  *H04L 25/03* (2006.01)
  *H04B 7/0456* (2017.01)
  *H04L 25/06* (2006.01)
  *H04L 25/02* (2006.01)
  *H04W 84/04* (2009.01)

(52) U.S. Cl.
  CPC .... *H04L 25/0224* (2013.01); *H04L 25/03006* (2013.01); *H04L 25/06* (2013.01); *H04W 84/042* (2013.01)

(58) Field of Classification Search
  CPC ... H04B 7/0456; H04B 7/0632; H04W 72/04; H04W 72/0453; H04W 72/0413; H04W 72/06; H04W 72/08; H04W 72/085; H04W 72/1226; H04W 72/1231; H04W 84/042; H04L 25/03; H04L 25/02; H04L 25/03949; H04L 5/0085; H04L 5/003; H04L 25/03006; H04L 25/06; H04L 25/0224; H04L 25/03891; H04L 25/03898; H04L 25/03923
  USPC .......................................................... 370/329
  See application file for complete search history.

(56) References Cited

U.S. PATENT DOCUMENTS

| | | | | |
|---|---|---|---|---|
| 2011/0009125 A1* | 1/2011 | Shin | ..................... | H04B 7/0417 455/452.1 |
| 2011/0319027 A1* | 12/2011 | Sayana | ................ | H04B 7/0632 455/67.11 |
| 2012/0300828 A1* | 11/2012 | Erez | .................. | H04L 25/03267 375/230 |
| 2014/0050274 A1* | 2/2014 | Kotecha | ............ | H04L 25/03343 375/267 |
| 2014/0169415 A1* | 6/2014 | Werner | ................ | H04B 7/0615 375/219 |
| 2017/0134078 A1* | 5/2017 | Frank | ........................ | H04L 5/14 |
| 2017/0311331 A1 | 10/2017 | Chae et al. | | |
| 2017/0331589 A1 | 11/2017 | Jang et al. | | |
| 2018/0227020 A1 | 8/2018 | Ahn et al. | | |

OTHER PUBLICATIONS

Successive Integer-Forcing and its Sum-rate Optimality 2013 (Year: 2013).*

Zhan et al., Integer-Forcing Linear Receivers, IEEE Trans Info Theory to Appear, Aug. 5, 2014.

Chae et al, "Multi-Level Coding Scheme for Integer-Forcing MIMO Receiver with Binary Codes", IEEE Transactions on Wireless Communications, vol. 16, No. 8, Aug. 2017.

Ordentlich at al., "Successive Integer-Forcing and its Sum-Rate Optimality," 2013 51st Annual Allerton Conference, Allerton House, UIUC, Illinois, USA, Oct. 2-3, 2013, pp. 282-292.

Jiening Zhan et al., 'Integer-Forcing Linear Receivers', arXiV:1003. 5966v4 [cs.IT], Aug. 5, 2014.

Oded Fischler, 'Universal Precoding for Parallel Gaussian Channels', Master of Science in Electrical and Electronic Engineering, Tel Aviv University, Oct. 2014.

Wendo He, 'Inter-forcing in multiterminal coding: uplink-downlink duality and source-channel duality', Boston University Theses & Dissertations, 2016.

Jiening Zhan, 'Structured Codes in Information Theory: MIMO and Network Applications', Electrical Engineering and Computer Sciences University of California at Berkeley, Technical Report No. UCB/EECS-2012-98, May 11, 2012.

International Search Report dated Nov. 26, 2018, issued in International Application No. PCT/KR2018/009745.

* cited by examiner

APPARATUS AND METHOD FOR CHANNEL FEEDBACK IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0107719, filed on Aug. 25, 2017, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for channel feedback in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent, as data traffic rapidly increases, various MIMO transmission and reception techniques are suggested to increase frequency efficiency and a transmission rate. The MIMO transmission and reception techniques consider linear schemes such as zero forcing (ZF) and minimum mean square error (MMSE) or nonlinear schemes such as maximum likelihood (ML) and sphere decoding. However, the nonlinear schemes exhibit good performance but suffer high complexity, whereas the linear schemes are not subject to relatively considerable complexity but do not outperform the nonlinear schemes. Meanwhile, in response to considerable channel change, the performance may be degraded in operations of a transceiver according to the MIMO transmission and reception scheme. Thus, an integer forcing (IF) scheme for exhibiting the performance close to the nonlinear schemes and achieving high gain in response to the considerable channel change is suggested.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for channel feedback in a wireless communication system.

Another aspect of the disclosure is to provide an apparatus and a method for receiving a signal using an integer forcing (IF) scheme in a wireless communication system.

Another aspect of the disclosure is to provide an apparatus and a method for guaranteeing an achievable transmission capacity in receiving a signal using an IF scheme in a wireless communication system.

Another aspect of the disclosure is to provide an apparatus and a method for determining a rank suitable for a channel in receiving a signal using an IF scheme in a wireless communication system.

Another aspect of the disclosure is to provide an apparatus and a method for determining a precoder suitable for a channel in receiving a signal using an IF scheme in a wireless communication system.

Another aspect of the disclosure is to provide an apparatus and a method for lowering decoding complexity in a wireless communication system.

Additional aspects will be set forth in part in the description which follows and, in part, will be apparent from the description, or may be learned by practice of the presented embodiments.

In accordance with an aspect of the disclosure, a first apparatus in a communication system is provided. The apparatus includes at least one processor and at least one transceiver operatively coupled with the at least one processor. The at least one processor may be configured to obtain a channel matrix based on a signal received from a second apparatus, obtain an integer matrix for IF based on the channel matrix, and generate channel information based on the integer matrix. The at least one transceiver may be configured to transmit the generated channel information to the second apparatus.

In accordance with another aspect of the disclosure, a method for operating a first apparatus in a communication system is provided. The method includes obtaining a channel matrix, based on a signal received from a second apparatus, obtaining an integer matrix for IF based on the channel matrix, generating channel information, based on the integer matrix, and transmitting the generated channel information to the second apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure to be described below, a hardware approach will be described as an example. However, since the various embodiments of the disclosure include a technology using both hardware and software, the disclosure does not exclude a software-based approach.

The disclosure provides an apparatus and a method for feeding channel state information (hereafter, referred to as channel information) back in a wireless communication system. Specifically, the disclosure provides a technique for feeding back the channel information for receiving/decoding a signal using an integer forcing (IF) scheme in the wireless communication system.

Terms indicating mathematical expressions (e.g., matrix, vector) of a signal, terms indicating mathematical expressions (e.g., integer, zero, non-integer) of a signal value, terms indicating capacities (e.g., IF capacity, IF effective capacity, transmission capacity, channel capacity), terms indicating network entities, and terms indicating components (e.g., a calculator, a linear combining unit, a combination solving unit, a decoder) of a device are mentioned for the sake of explanations. Accordingly, the disclosure is not limited to the terms to be described, and may use other terms having technically identical meaning.

The disclosure provides various embodiments with terms used in some communication standards (e.g., 3rd generation partnership project (3GPP)) by way of example. Various embodiments of the disclosure may be easily used in other communication systems.

Figure 1:
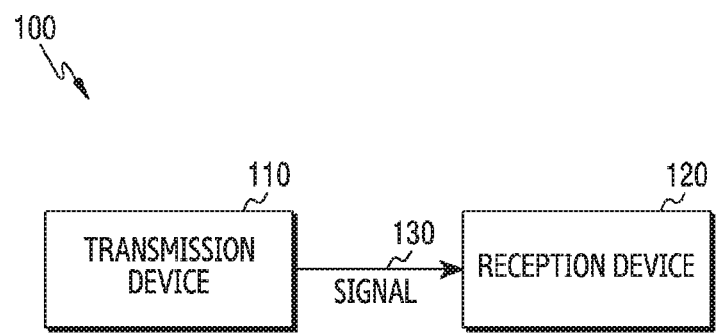
FIG. 1 illustrates a communication environment according to an embodiment of the disclosure.

FIG. 1 illustrates a wireless communication environment 100 according to an embodiment of the disclosure. FIG. 1 depicts a transmission device 110 and a reception device 120, as part of nodes which use a wireless channel in the wireless communication environment. The wireless communication environment 100 may include the transmission device 110 and the reception device 120.

Referring to FIG. 1, the transmission device 110 may transmit a signal 130 to the reception device 120. To decode the signal 130, the reception device 120 may support a plurality of reception algorithms. For example, the reception device 120 may support at least one of maximum likelihood (ML), zero forcing (ZF), minimum mean square error (MMSE), MMSE-successive interference cancelation (SIC), and the IF scheme. Herein, the IF scheme may be an algorithm based on channel integer-value. The reception device 120 may select one of the reception algorithms based on its control information, its setting information, or information measured by the transmission device 110, and use the selected algorithm to process received data.

The transmission device 110 and the reception device 120 are divided according to the transmission direction of the signal 130. Accordingly, one device may serve as the transmission device 110 or the reception device 120 according to a situation. For example, in downlink communication, the transmission device 110 may be a base station and the reception device 120 may be a terminal. For example, in uplink communication, the transmission device 110 may be a terminal and the reception device 120 may be a base station. In device to device (D2D) communication, the transmission device 110 may be a terminal and the reception device 120 may be another terminal. Herein, the D2D communication may be referred to as sidelink communication. The transmission device 110 may be a base station and the reception device 120 may be another base station. In some embodiments, the transmission device 110 and the reception device 120 may perform signaling over backhaul. The backhaul may be wireless backhaul. Besides, the transmission device 110 and the reception device 120 may be other various devices.

Herein, the base station is a network infrastructure which provides radio access to the terminal. The base station may be referred to as an access point (AP), an eNodeB (eNB), a 5$^{th}$ generation node (5G node), a 5G nodeB (NB), a wireless point, a transmission/reception point (TRP), or other technically equivalent term.

Herein, the terminal is a device used by a user and communicates with the base station over a wireless channel. In some cases, the terminal may be operated without user's involvement. That is, the terminal is a machine type communication (MTC) device, and may not be carried by the user. The terminal may be referred to as a user equipment (UE), a mobile station, a subscriber station, a remote terminal, a wireless terminal, an electronic device, a user device, or other technically equivalent term.

The signal received at the reception device 120 may be expressed as Equation 1.

$$Y=HX+Z \qquad \text{Equation 1}$$

Y denotes the signal received at the reception device 120, and X denotes a signal transmitted by the transmission device 110. H denotes a channel between the transmission device 110 and the reception device 120. Z denotes noise between channels. If the transmission device 110 includes $N_T$-ary antennas and the reception device 120 includes $N_R$-ary antennas, X may be a $N_T \times 1$ vector, Y and Z may be a $N_R \times 1$ vector, and H may be a $N_R \times N_T$ matrix.

In a multiple input multiple output (MIMO) environment for communications between a plurality of transmit antennas and a plurality of receive antennas, if the reception device 120 does not consider precoding in receiving the signal 130, a plurality of interference signals may be considered and decoding complexity may increase. Hence, the reception device 120 may increase a channel capacity by mitigating the interference signals through the precoding.

Now, the transmission device and the reception device are separated in FIG. 2 through FIG. 10 for the sake of explanations, but the functions of the device are not limited by its name. In other words, the reception device 120 may, if necessary, transmit not only control information (e.g., channel information) but also data to the transmission device 110.

Figure 2:
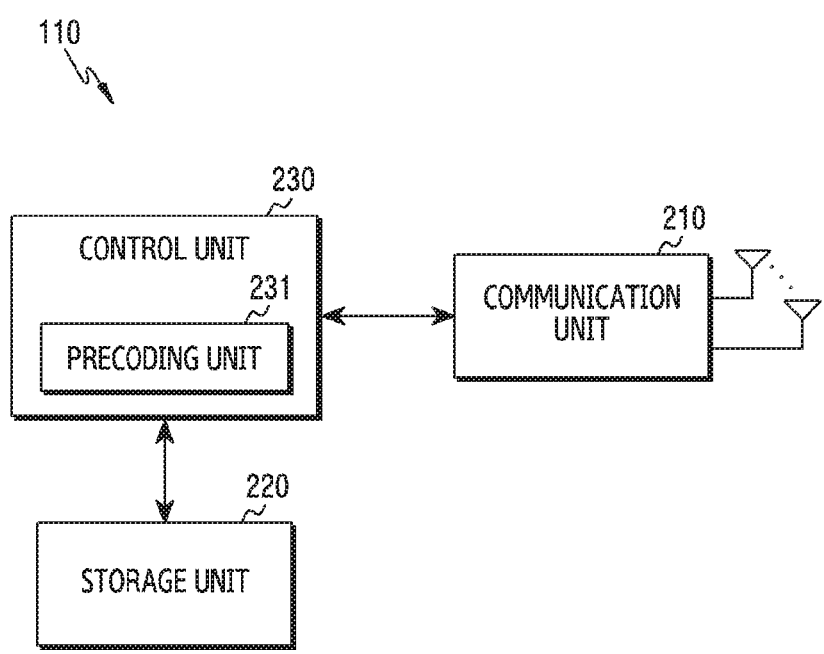
FIG. 2 illustrates a functional configuration of a transmission device according to an embodiment of the disclosure.

FIG. 2 illustrates a functional configuration of a transmission device according to an embodiment of the disclosure. The configuration of FIG. 2 may be understood as the configuration of the transmission device 110 of FIG. 1. A term such as 'portion' or '~er' used in the following indicates a unit for processing at least one function or operation, and may be implemented using hardware, software, or a combination of hardware and software. Functions of the device are not limited by its name as mentioned above, and the following explanations describe the transmission device 110 which not only transmits a signal to the reception device 120 of FIG. 1 but also receives a signal from the reception device 120.

Referring to FIG. 2, the transmission device 110 may include a communication unit 210 (e.g., a transceiver), a storage unit 220 (e.g., a memory), and a control unit 230 (e.g., at least one processor).

The communication unit 210 may transmit and receive signals over a wireless channel. For example, the communication unit 210 may perform a conversion function between a baseband signal and a bit sequence according to a physical layer standard of the system. For example, in control information transmission, the communication unit 210 generates modulation symbols by encoding and modulating a transmit bit sequence. Further, in data transmission, the communication unit 210 may up-convert the baseband signal to a radio frequency (RF) band signal, transmit it via an antenna, and down-convert an RF band signal received via an antenna to a baseband signal. For example, the communication unit 210 may include an encoder, a modulator, a digital to analog convertor (DAC), a transmit filter, an amplifier, a mixer, an oscillator, and so on. In data reception, the communication unit 210 may restore a receive bit sequence by demodulating and decoding a baseband signal. For the signal reception, the communication unit 210 may further include a decoder, a demodulator, an analog to digital convertor (ADC), a receive filter, and so on.

The communication unit 210 may include a plurality of antennas. The communication unit 210 may transmit a plurality of streams over the antennas respectively. The stream may be a data stream corresponding to a layer of the transmission device. The communication unit 210 may include a plurality of RF chains. Further, the communication unit 210 may perform beamforming. For the beamforming, the communication unit 210 may control a phase and an amplitude of signals transmitted/received over the antennas or antenna elements, that is, conduct analog beamforming. Alternatively, the communication unit 210 may beamform a digital signal, that is, conduct digital beamforming.

The communication unit 210 may include different communication modules for processing signals of different frequency bands. Further, the communication unit 210 may include a plurality of communication modules to support different radio access techniques. For example, different radio access techniques may include Bluetooth low energy (BLE), wireless fidelity (Wi-Fi), WiFi gigabyte (WiGig), and a cellular network (e.g., long term evolution (LTE), LTE-Advanced (LTE-A), 5G network). The different frequency bands may include a super high frequency (SHF) (e.g., 2.5 GHz, 5 GHz) band and a millimeter weave (e.g., 30 GHz, 60 GHz) band.

As such, the communication unit 210 transmits and receives the signals. Hence, the communication unit 210 may be referred to as a transmitter, a receiver, or a transceiver. Hereafter, the transmission and the reception over the wireless channel embraces the above-stated processing of the communication unit 210. According to various embodiments, the communication unit 210 may transmit a reference signal (RS). Herein, the RS may be an RS for estimating the channel. Further, the communication unit 210 may receive channel information according to a channel estimation result. The communication unit 210 may transmit data generated based on channel information. The communication unit 210 may transmit information regarding coded modulation and bit-symbol mapping of the transmission device to the reception device, or receive capability information regarding coded modulation and bit-symbol mapping of the reception device from the reception device.

The storage unit 220 may store a basic program for operating the transmission device 110, an application program, and data such as setting information. The storage unit 220 may include a volatile memory, a non-volatile memory, or a combination of a volatile memory and a non-volatile memory. The storage unit 220 may provide the stored data in response to a request of the control unit 230. According to various embodiments, the storage unit 220 may store precoders and indexes corresponding to the precoders, to identify a precoder according to information received from the reception device 120.

The control unit 230 may control general operations of the transmission device 110. For example, the control unit 230 may transmit and receive signals through the communication unit 210. Also, the control unit 230 may write and read data in and from the storage unit 220. For doing so, the control unit 230 may include at least one processor or microprocessor, or may be configured as part of a processor. Part of the communication unit 210 and the control unit 230 may be referred to as a communication processor (CP). According to various embodiments, the control unit 230 may include a precoding unit 231. The precoding unit 231 may set the precoder to apply to the data transmission based on the channel information. By setting the precoder, the precoding unit 231 may determine transmit streams to transmit through the layer. For example, the control unit 230 may control to fulfill operations, to be described, of the transmission device 110 according to various embodiments.

FIG. 2 illustrates the functional configuration of the transmission device 110. Herein, if the configuration of FIG. 2 is a configuration of a base station, it may further include a backhaul communication unit for providing an interface for communicating with a backhaul network.

Figure 3:
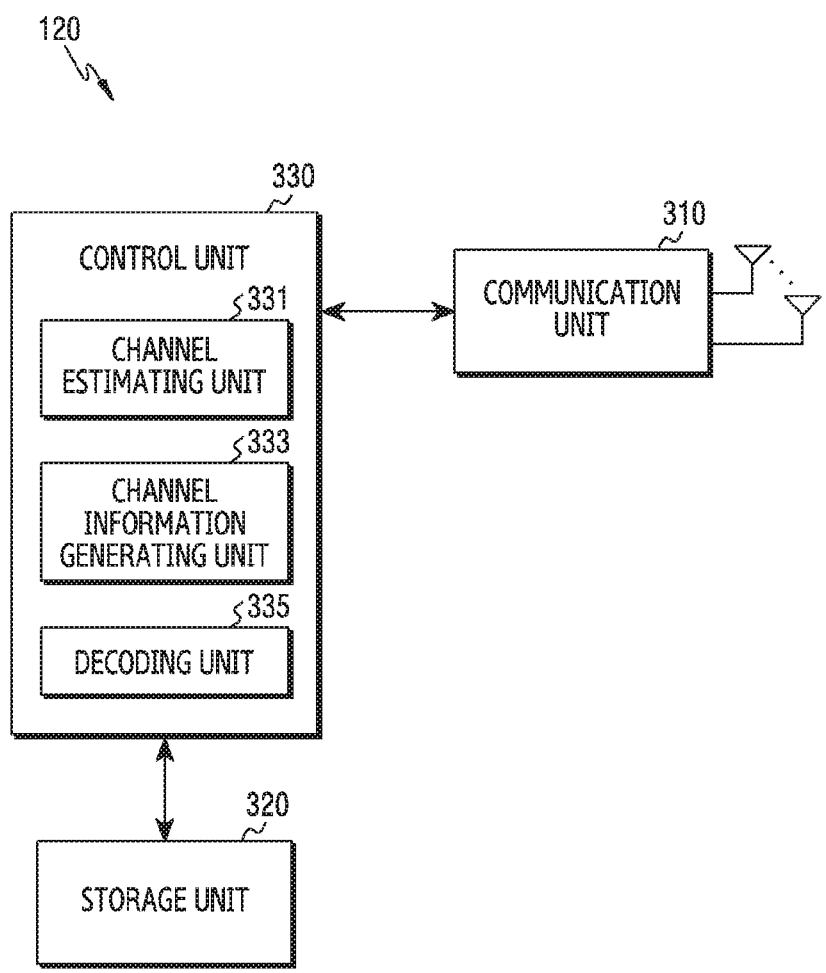
FIG. 3 illustrates a functional configuration of a reception device according to an embodiment of the disclosure.

FIG. 3 illustrates a functional configuration of a reception device according to an embodiment of the disclosure. The configuration of FIG. 3 may be understood as the configuration of the reception device 120 of FIG. 1. A term such as 'portion' or '~er' used in the following indicates a unit for processing at least one function or operation, and may be implemented using hardware, software, or a combination of hardware and software. Functions of the device are not limited by its name as mentioned above, and the following explanations describe the reception device 120 which not only receives a signal from the transmission device 110 of FIG. 1 but also transmits a signal to the transmission device 110.

Referring to FIG. 3, the reception device 120 may include a communication unit 310 (e.g., a transceiver), a storage unit 320 (a memory), and a control unit 330 (e.g., at least one processor).

The communication unit 310 may transmit and receive signals over a wireless channel. For example, the communication unit 310 may perform a conversion function between a baseband signal and a bit sequence according to a physical layer standard of the system. For example, in control information transmission, the communication unit 310 generates modulation symbols by encoding and modulating a transmit bit sequence. In data reception, the communication unit 310 may restore a receive bit sequence by demodulating and decoding a baseband signal. Further, the communication unit 310 may up-convert the baseband signal to an RF band signal, transmit it via an antenna, and down-convert an RF band signal received via an antenna to a baseband signal. For example, the communication unit 310 may include a decoder, a demodulator, an ADC, a receive filter, an amplifier, a mixer, an oscillator, and so on. For the signal transmission, the communication unit 310 may further include an encoder, a modulator, a DAC, a transmit filter, and so on.

The communication unit 310 may include a plurality of antennas. The communication unit 310 may receive a plurality of streams over the antennas respectively. The communication unit 310 may include a plurality of RF chains. Further, the communication unit 310 may perform beamforming. For the beamforming, the communication unit 310 may control a phase and an amplitude of signals transmitted/received over the antennas or antenna elements, that is, conduct analog beamforming. Alternatively, the communication unit 310 may beamform a digital signal, that is, conduct digital beamforming.

The communication unit 310 may include different communication modules for processing signals of different frequency bands. Further, the communication unit 310 may include a plurality of communication modules to support different radio access techniques. For example, different radio access techniques may include BLE, Wi-Fi, WiGig, and a cellular network (e.g., LTE, LTE-A, 5G network). The different frequency bands may include an SHF (e.g., 2.5 GHz, 5 GHz) band and a millimeter weave (e.g., 30 GHz, 60 GHz) band.

As such, the communication unit 310 transmits and receives the signals. Hence, the communication unit 310 may be referred to as a transmitter, a receiver, or a transceiver. Hereafter, the transmission and the reception over the wireless channel embraces the above-stated processing of the communication unit 310. According to various embodiments, the communication unit 310 may receive a signal for estimating a channel. Further, the communication unit 310 may feed channel information (e.g., channel state information (CSI)) generated by the control unit 330, to be explained, back to other device (e.g., the transmission device 110 of FIG. 1). The communication unit 310 may receive data generated based on channel information fed back to the other device. Further, the reception device may signal to determine a reception scheme with the transmission device, through the communication unit 310. For example, the signaling may exchange at least one of coded modulation information, bit-to-symbol mapping information, channel change information, and MIMO channel correlation information.

The storage unit 320 may stores a basic program for operating the reception device 120, an application program, and data such as setting information. The storage unit 320 may include a volatile memory, a non-volatile memory, or a combination of a volatile memory and a non-volatile memory. The storage unit 320 may provide the stored data in response to a request of the control unit 330. According to various embodiments, the storage unit 320 may store precoders, to feed the channel information back to the transmission device.

The control unit 330 may control general operations of the reception device 120. For example, the control unit 330 may transmit and receive signals through the communication unit 310. Also, the control unit 330 may write and read data in and from the storage unit 320. For doing so, the control unit 330 may include at least one processor or microprocessor, or may be configured as part of a processor. Part of the communication unit 310 and the control unit 330 may be referred to as a CP.

According to various embodiments, the control unit 330 may include a channel estimating unit 331, a channel information generating unit 333, and a decoding unit 335. The channel estimating unit 331 may estimate the channel, based on a signal (e.g., an RS) received from the other device (e.g., the transmission device 110 of FIG. 1). The channel estimating unit 331 may generate the channel information based on the estimated channel. The decoding unit 335 may detect symbols received from the transmission device 110, based on the reception algorithm, and decode the signal. Herein, the symbols may the signal generated at the other device based on the channel information.

The channel estimating unit 331, the channel information generating unit 333, and the decoding unit 335 may be, as an instruction set or code stored in the storage unit 320, instructions/code resided at least temporarily in the control unit 330, a storage space for storing the instructions/code, or part of circuitry of the control unit 330. The channel information generating unit 333 or the decoding unit 335 may include at least one of a calculator, an equalizer, and a detector. The calculator may determine an integer matrix of the IF scheme from a channel matrix, according to setting, and determine symbol-sums according to the integer matrix. The equalizer may cancel or mitigate noise or inter-symbol interference (ISI) of the signal received through the communication unit 310. The detector may detect a value of the received symbol. The detector may perform decision (e.g., hard decision, soft decision) from a probability of a bit value. In addition, the detector may decode a codeword. In some embodiments, the channel information generating unit 333 may include an integer vector search unit for searching for an integer vector, to be described. In some other embodiments, the channel information generating unit 333 may further include a separate calculator for Cholesky decomposition and SIC, to be explained. The control unit 330 may control the reception device 120 to fulfill operations according to various embodiments.

FIG. 3 illustrates the functional configuration of the reception device 120. Herein, if the configuration of FIG. 3 is the configuration of the base station, it may further include a backhaul communication unit for providing an interface for communicating with a backhaul network.

FIG. 1, FIG. 2, and FIG. 3 have described the environment for receiving the signal and the configuration of the transmission device or the reception device for transmitting/receiving the signal. Hereafter, in FIG. 4A and FIG. 4B, a specific example of the control unit 330 for IF decoding and IF detection, as the IF scheme, is explained, and terms for the IF scheme are defined.

Figure 4A:
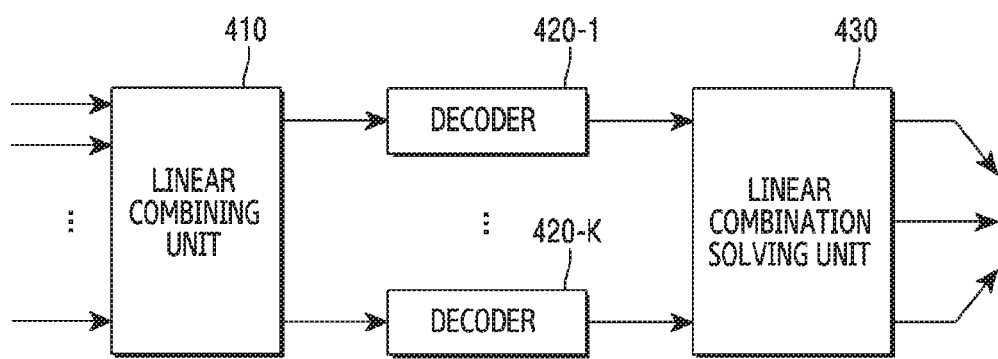
FIG. 4A illustrates a functional configuration of a control unit for integer forcing (IF) decoding according to an embodiment of the disclosure.

FIG. 4A illustrates a functional configuration of a control unit 330 for IF decoding in a wireless communication system according to an embodiment of the disclosure.

Referring to FIG. 4A, the control unit 330 may include a linear combining unit 410, decoders 420-1 through 420-K, and a linear combination solving unit 430. Herein, the linear combining unit 410 may be referred to as a linear equalizer, and the linear combination solving unit 430 may be referred to a linear equation solving unit.

The linear combining unit 410 may multiply a signal received over radio channels of multiple antennas, by an equalization matrix. In so doing, the linear combining unit 410 may determine the equalization matrix based on a channel quality and a channel matrix and, or receive the equalization matrix from other block of the reception device 120.

$$\tilde{Y}=BY \quad \text{Equation 2}$$

B denotes the equalization matrix, Y denotes the received signal, and $\tilde{Y}$ denotes an equalized signal. For example, if receiving a signal, which is transmitted via four transmit antennas, via four receive antennas, the reception device 120 may receive four (transmit) streams. Y and $\tilde{Y}$ may be expressed as a 4×1 vector. B may be expressed as a 4×4 vector. While the reception device 120 receives a different stream per antenna, the detection and the decoding are conducted on a codeword basis and thus are explained on the codeword basis.

By combining Equation 1 and Equation 2, the received signal may be expressed as Equation 3.

$$\tilde{Y}=BHX+BZ \quad \text{Equation 3}$$

$\tilde{Y}$ denotes the equalized signal. B denotes the equalization matrix, X denotes a signal transmitted from the transmission device 110, and H denotes a channel between the transmission device 110 and the reception device 120. Z denotes noise between the channels.

For the IF decoding, the linear combining unit 410 may determine an integer-valued effective channel matrix. Hereinafter, to ease the understanding, the integer-valued effective channel matrix is referred to as an integer matrix. According to various embodiments of the disclosure, the integer matrix may include an integer vector including one column or one row. The linear combining unit 410 may determine the integer matrix for minimizing effective noise in the equalized signal. The integer matrix may be determined to obtain a full-range matrix, because an inverse matrix of A is required to solve a linear combination as expressed in Equation 6, to be described. In some embodiments, the integer matrix may have a lower range the full-rank according to the number of the transmit antennas and the number of the receive antennas, according to a precoder matrix of the reduced rank. The linear combining unit 410 may separate a codeword part and an effective noise part in Equation 3, according to the determined integer matrix.

$$\tilde{Y}=AX+\{(BH-A)X+BZ\} \quad \text{Equation 4}$$

$\tilde{Y}$ denotes the equalized signal. A denotes the integer matrix, X denotes the signal transmitted from the transmission device 110, B denotes the equalization matrix, and H denotes the channel between the transmission device 110 and the reception device 120. Z denotes the noise between the channels.

AX may denote the codeword part, and {(BH−A)X+BZ} may denote the effective noise part. The codeword part, as the combined codeword, indicates that at least some of codewords received via the antennas are linearly summed. Hereafter, the combined codeword is referred to as a summed codeword.

Meanwhile, if X is expressed on a symbol basis, not on the codeword basis, AX may be referred to as a symbol-sum. If X is expressed on a stream basis, not on the codeword basis, AX may be referred to as a mixed-stream. That is, the unit for expressing the bit merely differs, and the summed codeword, the symbol-sum and the mixed-stream may represent AX in Equation 4.

The linear reception algorithm such as ZF or MMSE distinguishes signals per antenna according to an effective identity matrix (or diagonal matrix), whereas the calculation of the linear combining unit 410 generates the summed-codeword according to the integer matrix. In other words, the linear combining unit 410 may output different codewords generated by the combination of the codewords transmitted from the transmission device 110. For example, according to an element of the integer matrix, the summed-codeword of a first receive antenna may be a mixed codeword of not only a first codeword of a first transmit antenna but also a third codeword of a third transmit antenna and a fourth codeword of a fourth transmit antenna. Since each element of the integer matrix includes the integer, the summed-codeword may also include the effective codeword according to a modulo operation.

$$u_m = \sum_l a_{m,l} w_l \quad \text{Equation 5}$$

$u_m$ denotes a summed-codeword corresponding to an m-th receive antenna. l denotes an index of the transmit antennas, and $a_{m,l}$ denotes an element of an m-th row and an l-th column of the integer matrix. $w_l$ denotes a codeword corresponding to an l-th transmit antenna.

The linear combining unit 410 may output signals by summing the summed-codewords and the effective noise. Herein, outputting the summed-codewords is referred to as sum-detection.

The decoders 420-1 through 420-K may decode the codewords outputted from the linear combining unit 410. K may correspond to the number of the receive antennas. The codeword is a unit independently decoded, and may include at least one codeword per stream. For example, if a stream includes symbols of 16 quadrature amplitude modulation (QAM), the codeword decoding may be conducted maximum four (=$\log_2 16$) times per stream with respect to the symbols corresponding to the codeword length. For example, if a stream includes binary phase shift keying (BPSK) symbol, the codeword decoding may be conducted one (=$\log_2 2$) time per stream with respect to the symbols corresponding to the codeword length.

By decoding the summed-codeword corresponding to the receive antennas, the decoders 420-1 through 420-K may output the summed-codewords with interference cancelled. In so doing, the decoders 420-1 through 420-K each may serve as a single input single output (SISO) decoder. That is, the decoders 420-1 through 420-K each may perform the decoding, without considering interference from other antennas. Decoding by considering the linear combination of the summed codewords, rather than decoding the codeword individually, is referred to as sum-decoding.

The linear combination solving unit 430 may perform inversion corresponding to the combination of the linear combining unit 410. That is, the linear combination solving unit 430 solves the combination of the bits of the linear combination solving unit 430. Hence, the bits before the encoding, of the codewords generated at the transmission device 110 may be estimated. Namely, the linear combination solving unit 430 outputs estimated bits of un-encoded bits of the codewords generated at the transmission device 110. For example, the linear combination solving unit 430 may determine original information words transmitted from the transmission device 110, based on Equation 6.

$$W = A^{-1} U \qquad \text{Equation 6}$$

W denotes a vector indicating the information word, and A denotes the integer matrix of Equation 4. U denotes a vector of the information word-sums outputted from the decoders 420-1 through 420-K.

Figure 4B:
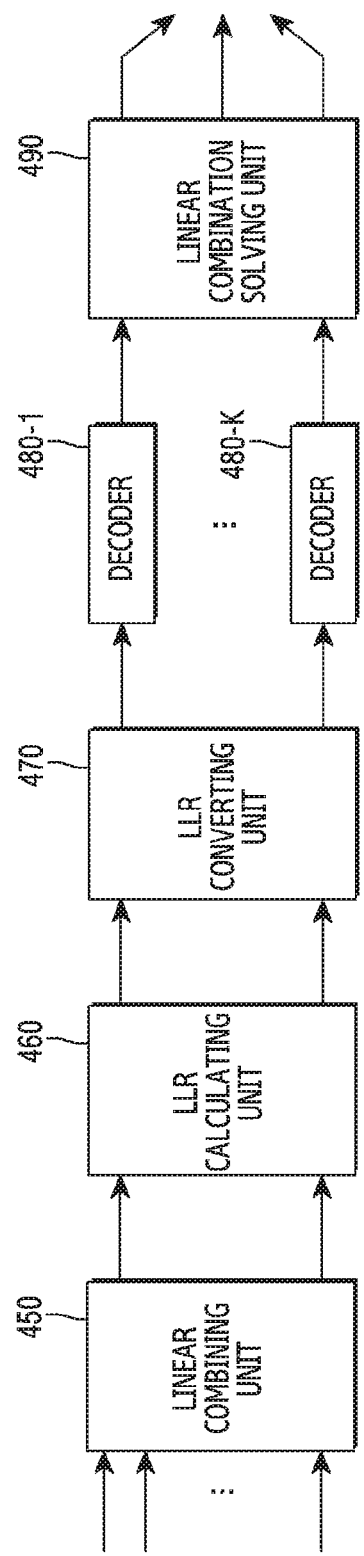
FIG. 4B illustrates a functional configuration of a control unit for IF detection according to an embodiment of the disclosure.

FIG. 4B illustrates a functional configuration of the control unit 330 for the IF detection according to an embodiment of the disclosure.

Referring to FIG. 4, the control unit 330 may include a linear combining unit 410, a log likelihood ratio (LLR) calculating unit 460, an LLR converting unit 470, decoders 480-1 through 480-K, and a linear combination solving unit 490. The linear combining unit 450 may be referred to as a linear equalizer, and the linear combination solving unit 480 may be referred to a linear equation solving unit.

The linear combining unit 450 may multiply a signal received over radio channels of multiple antennas, by an equalization matrix. According to the calculation of the linear combining unit 450, signals may be outputted by summing summed-codewords and effective noise. Specifically, signals may be outputted by summing symbol-sums and effective noise, per n-ary time unit. Herein, the time unit may a time unit in which one symbol is received via one antenna. The symbol-sums may be a bit corresponding to one time unit of the summed-codewords. Outputting the symbol-sums is referred to as sum-detection, as in the summed-codeword.

Unlike the linear combining unit 410 of FIG. 4A, the linear combining unit 450 may generate the integer matrix in every time unit. That is, while the IF decoding of FIG. 4A uses the single integer-valued effective channel matrix, the IF detection may use a plurality of integer matrices. For example, if a channel matrix for a t-th receive signal is $H_t$, the linear combining unit 450 may multiply the t-th receive signal by the equalization matrix $B_t$ (t=1, 2, . . . , n). Hence, the linear combining unit 450 may generate integer matrices $A_1, A_2, \ldots, A_n$ in each time unit. In the words, the linear combining unit 450 may adaptively change the integer matrix based on time.

The LLR calculating unit 460 may calculate LLR values using the integer matrix. That is, if the linear combining unit 450 determines $A_t$, the LLR calculating unit 460 may calculate the LLR values for the symbol-sum per receive antenna in the signal received in the time unit t, using $A_t$. Unlike the IF decoding of FIG. 4A, the reception device 120 for the IF detection newly determines integer matrix per time unit, by reflecting channel influence which changes based on time.

Like the IF decoding, the IF detection may also use the inverse matrix of A to solve the linear combination. The decoding is performed on the codeword basis, and the LLR values of the symbols combined by the integer matrices $A_1, A_2, \ldots, A_n$ may be recombined based on one common new integer matrix. The LLR converting unit 470 may convert the LLR values to correspond to the new integer matrix. Herein, the new integer matrix is referred to as a converting integer matrix. The converting integer matrix may be expressed as $\overline{A}$. The LLR converting unit 470 may convert the LLR values of the symbol-sum corresponding to $A_t$ to the LLR values of the symbol-sum of the converting integer matrix $\overline{A}$. In some embodiments, the converting integer matrix $\overline{A}$ may be predefined. For example, the converting integer matrix $\overline{A}$ may be defined as an identity matrix.

The decoders 480-1 through 480-K may decode the codewords using the LLR values outputted from the LLR converting unit 470. K may correspond to the number of the receive antennas. The decoders 480-1 through 480-K each may operate as a SISO decoder. The decoders 480-1 through 480-K may perform soft decision on the converted LLR values and then determine a bit value of each symbol-sum. In other words, the IF decoding algorithm may be applied to the converted LLR values. In some embodiments, if the converting integer matrix $\overline{A}$ is predefined, the decoders 480-1 through 480-K may perform the soft decision on the converted LLR values and then determine the symbol per transmit antenna, rather than the symbol-sum per transmit antenna. The decoders 480-1 through 480-K may output the symbol value per transmit antenna. Specifically, in the MLC environment, the decoders 480-1 through 480-K may recursively output the bit per transmit antenna, from the least significant bit (LSB) to the most significant bit (MSB). The output bits construct the symbol. By use of the converting integer matrix $\overline{A}$, the reception device 120 may solve the symbol-sums for different integer matrices per time unit.

The linear combination solving unit 490 may invert the decoding results from the decoders 480-1 through 480-K to the combination of the converting integer matrix $\overline{A}$. The linear combination solving unit 490 may restore the information words transmitted from the transmission device 110 in the time unit t by multiplying the symbol-sums by the converting integer matrix $\overline{A}$. As stated earlier, in some embodiments, if the converting integer matrix $\overline{A}$ is the identity matrix, the decoding may be conducted without considering the linear combination of the codeword (or symbol). Thus, the configuration of the linear combination solving unit 490 may be omitted in the reception device 120. The decoding not considering the linear combination may be referred to as individual codeword coding.

The signal reception method using the IF scheme such as IF decoding or IF detection has been described in FIG. 4A and FIG. 4B. In the signal reception using the IF scheme, if the reception device receives the signal on the assumption that the transmission device does not precode the signal, the reception device may receive and decode the signal by assuming that the transmit stream is transmitted via all the transmit antennas. Assuming that the transmit stream is transmitted via all the transmit antennas, complexity of the transmission device may extremely increase. Accordingly, the reception device requires a rank adaptation scheme and a precoder selection scheme to apply a rank suitable for the channel state. If the transmission device transmits a signal by applying a precoder suitable for the IF reception scheme, the reception performance of the reception device may improve. Now, a feedback procedure of channel information including precoding information or rank information for the IF scheme is explained.

Figure 5:
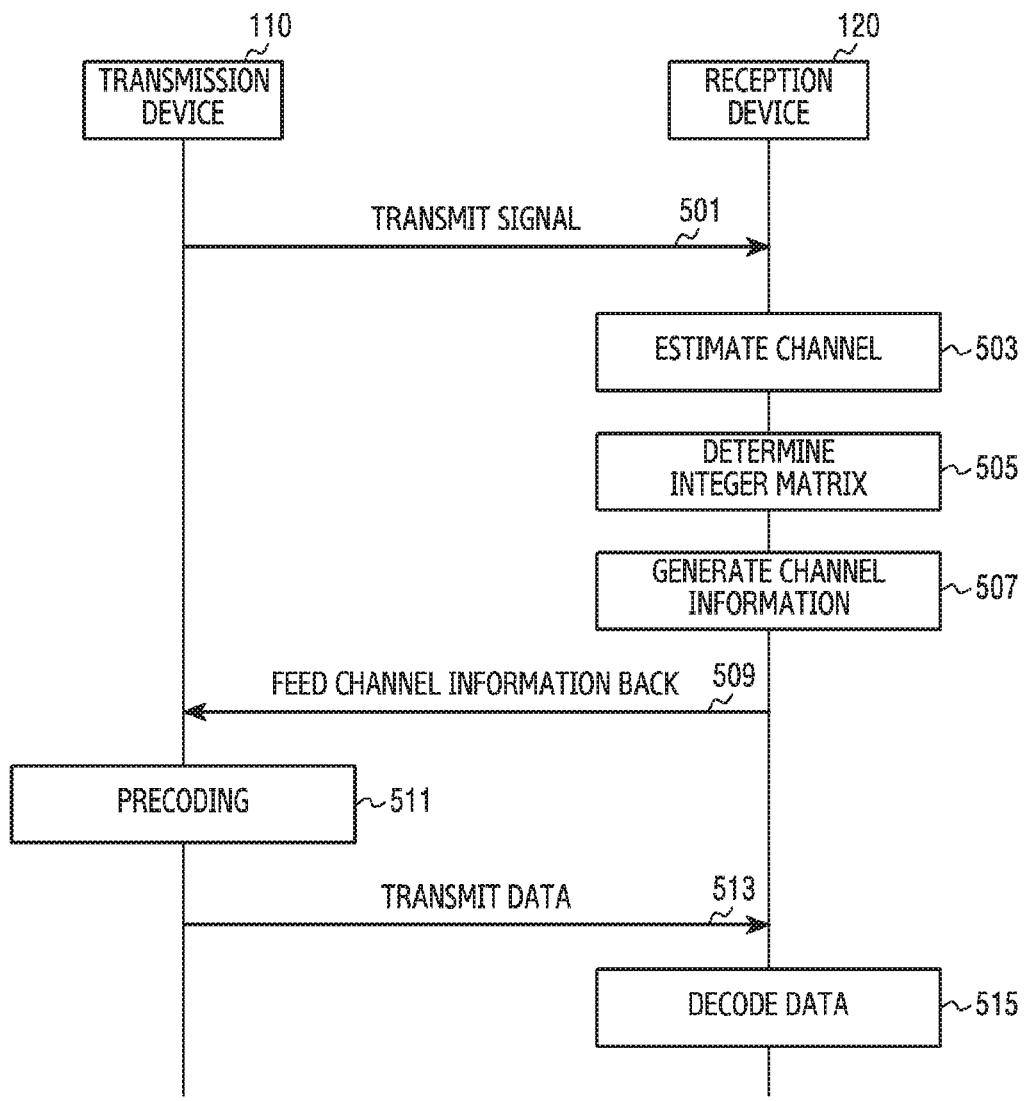
FIG. 5 illustrates a channel feedback procedure according to an embodiment of the disclosure.

FIG. 5 illustrates a channel feedback procedure according to an embodiment of the disclosure. The transmission device represents the transmission device 110 of FIG. 1. The reception device represents the reception device 120 of FIG. 1.

Referring to FIG. 5, in operation 501, the transmission device transmits a signal. The reception device may receive the signal from the transmission device. The signal may be an RS for estimating a channel. The signal may be an RS for determining a channel state. For example, the signal may be one of a cell-specific reference signal (CRS), a CSI-RS, and a demodulation (DM)-RS. According to other embodiment, the signal may be a synchronization signal (SS).

In operation 503, the reception device may estimate the channel. The reception device may estimate the channel between the transmission device and the reception device, based on the received signal. The reception device may determine a channel matrix indicating the channel between transmit antennas of the transmission device and receive antennas of the reception device. In other words, the reception device obtains the channel matrix. The channel matrix may correspond to H of Equation 1.

In operation 505, the reception device may determine an integer matrix. The reception device may determine the integer matrix from the channel matrix, according to the IF scheme (IF technique). In other words, the reception device obtains the integer matrix from the channel matrix. The integer matrix may be a matrix for minimizing effective noise, according to an equalization matrix. In some embodiments, the reception device may determine the integer matrix having the same dimension as the channel matrix. The integer matrix may be A of Equation 4. The integer matrix A of Equation 4, which considers the number of the transmit antennas and the number of the receive antennas, may be referred to as a full integer matrix. In some other embodiments, the reception device may determine the integer matrix of a lower dimension than the channel matrix. That is, the integer matrix may be at least one of the columns of A of Equation 4. That is, the integer matrix determined by the reception device may include an integer vector of which the row or column size is 1. To lower complexity for generating channel information, the reception device may determine an integer vector, rather than the full integer matrix, including some columns (e.g., one column) of the full integer matrix. In other words, the integer matrix may include the integer vector in this disclosure. Hereafter, if necessary, the integer matrix including one column is referred to as the integer vector and the integer matrix including $N_T$-ary columns is referred to as the full integer matrix.

In operation 507, the reception device may generate channel information. The channel information may be CSI. The channel information may include rank information indicating the number of the transmit streams suitable for the channel, that is, the rank. For example, the rank information may a rank indicator (RI). The RI may indicate the number of transmit streams received at a terminal over the same resource. Further, the channel information may include precoding information indicating a precoder adequate for the channel. For example, the precoding information may be a precoding matrix indicator (PMI). The precoder reflects spatial characteristics of the channel, and the PMI indicates a precoder index preferred by a reception stage. The channel information may include channel quality information indicating a channel quality. For example, the channel quality information may be a channel quality indicator (CQI). The CQI may indicate, if the precoder based on the PMI is used, a received signal quality (e.g., signal-to-interference plus noise ratio (SINR)).

The reception device may determine precoding information. The reception device may determine a capacity (hereafter, an IF capacity) for the IF scheme from the integer matrix. The IF capacity may indicate, if decoding a signal using the IF scheme, an achievable transmission rate or transmission capacity of the transmit streams. The reception device may determine the IF capacities from the integer matrices of the precoders. Among the precoders, the reception device may identify a precoder corresponding to the integer matrix of the greatest IF capacity. The identified precoder may be referred to as an IF precoder. The reception device may generate precoding information indicating the IF precoder. In some embodiments, the reception device may generate precoding information including the index indicating the IF precoder. For example, the reception device and the transmission device may store a table (e.g., a codebook) which defines mapping between precoding matrices and indexes.

The reception device may determine rank information. The reception device may calculate a rate of each transmit stream from the integer matrix. Herein, the rate may indicate an achievable transmission capacity of each transmit stream. That is, the rate indicates an obtainable capacity at the reception stage if each transmit stream is transmitted over the channel. In the following equations, the vector corresponding to each transmit stream indicates one of the columns. For example, a vector corresponding to an i-th transmit stream of the channel matrix may correspond to an i-th column of the channel matrix. That is, the rate may indicate the achievable capacity of the transmit stream calculated from the estimated channel, rather than the rate of the transmit stream actually transmitted. The reception device may determine the number of transmit streams to be used in data transmission (or data burst), according to the rates of the transmit streams. Namely, the reception device may determine the rank.

In some embodiments, the reception device may determine the rank together with the IF precoder. The reception device may calculate the IF capacity for all of the precoding matrices of precoder sets, without considering the size of the precoding matrix. Herein, the precoder set may be a set of precoders having the same rank, that is, having the same number of the columns of the matrix. The reception device may determine the IF precoder size, that is, the rank according to the number of the columns of the IF-precoding matrix.

In other words, if identifying the IF precoder, the reception device may concurrently determine the rank suitable for the channel.

In some other embodiments, the reception device may determine the rank and then determine the IF precoder. Specifically, the reception device may identify the precoder set corresponding to the rank, among the precoder sets. The reception device may calculate the IF capacity for each of the precoders of the identified precoder set. The reception device may identify the IF precoder among the precoders of the precoder set.

In operation 509, the reception device may feed the channel information back to the transmission device. The reception device may transmit the generated channel information to the transmission device. In some embodiments, the reception device may transmit the rank information and the precoding information to the transmission device. In some other embodiments, the reception device may transmit the rank information to the transmission device. Next, the reception device may transmit the precoding information corresponding to the rank information, to the transmission device. In some other embodiments, the reception device may transmit only the precoding information. The reception device may obtain information regarding the number of streams to transmit, from the precoding information.

Transmission periods of the rank information and the precoding information of the channel information may vary according to setting between the transmission device and the reception device. For example, the feedback period of the precoding information may be shorter than the feedback period of the rank information. That is, the precoding information may be fed back to the transmission device more frequently than the rank information. The reception device may identify the precoder suitable for the channel change based on time, in the precoder set according to pre-transmitted rank information. Since the rank information is fixed and the dimension of the precoders is also fixed, the reception device may identify the precoder suitable for a current channel state with low complexity. The reception device may periodically or repeatedly identify the precoder according to the set rank, until the rank is changed. Next, if a new rank is determined according to the channel change, the reception device may repeat identifying the precoder, in response to the new rank.

In operation 511, the transmission device may perform the precoding according to the channel information. The transmission device may identify the precoder indicated by the precoding information of the channel information. For example, the transmission device may determine a precoding matrix corresponding to the index indicated by the precoding information. The transmission device may perform mapping between layers and antennas, that is, perform layer mapping according to the determined precoding matrix. The transmission device may determine the number of layers, according to the rank information or the precoding information. The transmission device may determine transmit streams corresponding to the layers, from a plurality of codewords. The transmission device may send the transmit streams to its antennas according to the set precoding matrix.

In operation 513, the transmission device may transmit data to the reception device. The data may include the transmit streams. The transmission device may transmit the transmit streams to the reception device via at least one transmit antenna. The reception device may receive the data via at least one receive antenna.

In operation 515, the reception device may decode the data. The reception device may decode the received data using the IF scheme. For example, the reception device may decode the data using the IF decoding of FIG. 4A. For example, the reception device may decode the data using the IF detection of FIG. 4B. While the IF decoding scheme is explained after the data reception in the following, an arbitrary decoding scheme using the IF scheme besides the IF detection may be carried out.

While the transmission device transmits the signal and the reception device estimates the channel and generates the channel information in FIG. 5, the channel information may be determined and generated in a different manner. In some embodiments, the reception device may receive the signal and the transmission device may estimate the channel and generate the channel information. In so doing, the channel may satisfy channel reciprocity between the transmission stage/reception stage.

Hereinafter, the operation of determining, generating a matrix (e.g., integer matrix, channel matrix) or information (e.g., channel information, precoder information, rank information) means that the matrix or the information is obtained by the apparatus.

Precoder Selection Scheme for IF

Figure 6:
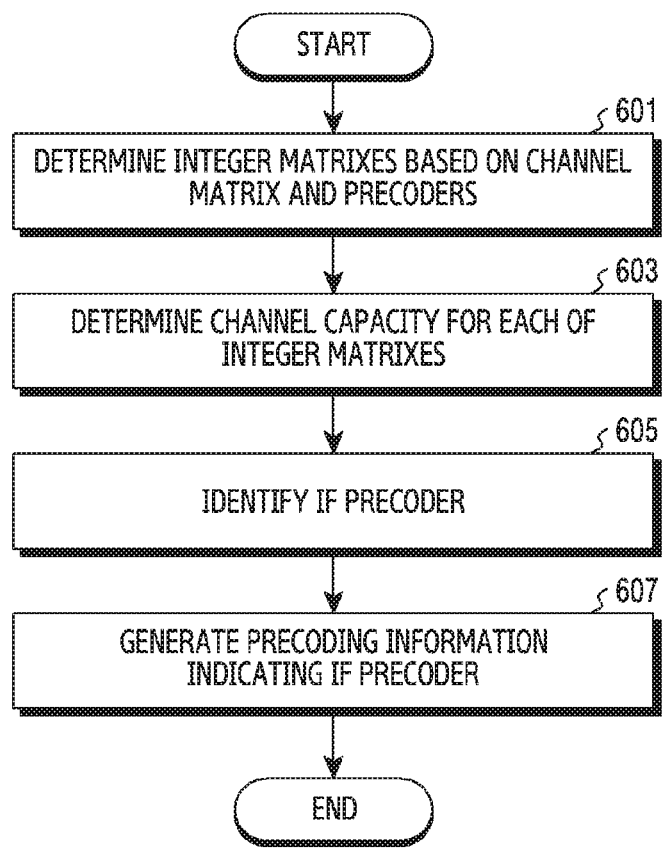
FIG. 6 illustrates a flowchart of operations of a reception device for generating precoding information according to an embodiment of the disclosure.

FIG. 6 illustrates a flowchart of operations of a reception device for generating precoding information according to an embodiment of the disclosure. The reception device represents the reception device 120 of FIG. 1.

Referring to FIG. 6, in operation 601, the reception device may determine a plurality of integer matrices based on a channel matrix and a plurality of precoders. The reception device may determine a plurality of precoding channels, according to the precoders and the channel matrix respectively. Herein, the precoding channel indicates a channel applied with a precoder. The precoding channel may be defined as Equation 7.

$$\overline{H}_i = H \times P_i \qquad \text{Equation 7}$$

$\overline{H}_i$ denotes the precoding channel, H denotes the channel matrix, and $P_i$ denotes an i-th precoding matrix (precoder).

The reception device may determine the integer matrices from the precoding channels. The reception device may determine an integer matrix for maximizing a rate obtainable using the IF, from each precoding channel. Alternatively, the reception device may determine an integer matrix for minimizing effective noise. In some embodiments, the integer matrix may be determined based on Equation 8 and Equation 9.

$$A = \underset{\substack{A \in Z^{M_T \times M_T} \\ rank(A) = M_T}}{\arg \min} \, \underset{m}{\max} \| D^{-1/2} V^T a_m \|^2 \qquad \text{Equation 8}$$

$$VDV^T = I + SNR \cdot \overline{H}_i^T \overline{H}_i \qquad \text{Equation 9}$$

$M_T$ denotes the number of transmit streams, A denotes the integer matrix, M denotes the transmit streams, $a_m$ denotes an m-th column of the integer matrix, V denotes an orthogonal matrix of singular value decomposition (SVD), D denotes a diagonal matrix of the SVD, SNR denotes a signal-to-noise ratio (SNR), and $\overline{H}_i$ denotes a precoding channel applied with an i-th precoder. Herein, SNR may be an SNR value in channel estimation.

In some embodiments, the precoders may include precoders having various ranks. That is, the reception device may determine IF capacities of the precoders regardless of the rank. In some other embodiments, the precoders may have a size according to a given rank. For example, if the rank is 4, the precoders each may be a matrix including four column vectors.

In operation 603, the reception device may determine a channel capacity for each of the integer matrices. The channel capacity may be the IF capacity. The reception device may determine the IF capacities of the integer matrices based on Equation 10 and Equation 11.

$$R_{IF}(\overline{H}) = M_T \cdot \max_{\substack{A \in Z^{M_T \times M_T} \\ rank(A) = M_T}} \min_{m=1,\ldots,M_T} R_{comp}(\overline{H}, a_m)$$ Equation 10

$$R_{comp}(\overline{H}, a_m) = \max\left(-\frac{1}{2}\log(\| D^{-1/2} V^T a_m \|^2), 0\right)$$ Equation 11

$R_{IF}(\overline{H})$ denotes the IF capacity of the precoding channel corresponding to the integer matrix, $M_T$ denotes the number of the transmit streams, A denotes the integer matrix, m denotes the transmit streams, and $a_m$ denotes the m-th column of the integer matrix. $R_{comp}(\overline{H}, a_m)$ denotes a channel capacity for an m-th transmit stream, V denotes the orthogonal matrix of the SVD, and D denotes a diagonal matrix of the SVD.

In operation 605, the reception device may identify an IF precoder. The reception device may identify the IF precoder corresponding to the greatest IF capacity, among the IF capacities calculated in operation 603.

In operation 607, the reception device may generate precoding information indicating the IF precoder. In some embodiments, the reception device may generate the precoding information including an index of the IF precoder.

Although not depicted in FIG. 6, the reception device may identify the IF precoder and concurrently determine the rank. The reception device may determine the number of layers of the transmission device from a size of the precoding matrix corresponding to the IF precoder. The reception device may determine rank information indicating the number of the layers. The reception device may feed not only the precoding information but also the rank information back to the transmission device. In some embodiments, the reception device may feed channel information including both of the rank information and the precoding information back to the transmission device.

Rank Adaptation Scheme for IF

Figure 7:
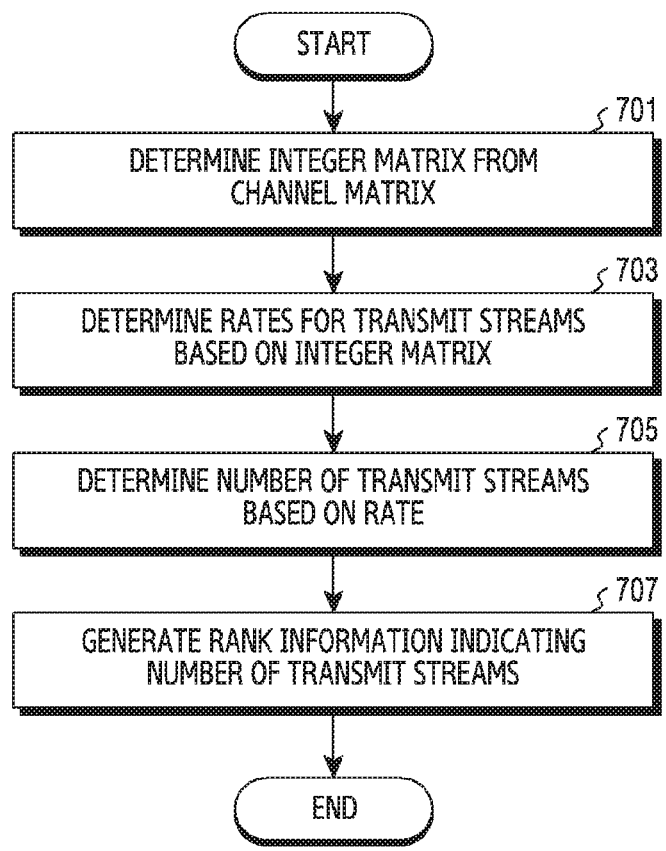
FIG. 7 illustrates a flowchart of operations of a reception device for determining rank information according to an embodiment of the disclosure.

FIG. 7 illustrates another flowchart of operations of a reception device for determining rank information according to an embodiment of the disclosure. Hereafter, the reception device represents the reception device 120 of FIG. 1. If integer matrices for all of precoders having various ranks are determined, computational complexity of the reception device may increase. In particular, as the number of the ranks, that is, the number of layers increases, the computational complexity exponentially increases and thus load of the reception device may increase. Hence, to reduce the computations using the IF scheme, the reception device may pre-determine the number of transmittable streams of the transmission device, that is, the number of the layers.

Referring to FIG. 7, in operation 701, the reception device may determine an integer matrix from a channel matrix. The reception device may determine the integer matrix for maximizing a transmission rate obtainable using the IF. Alternatively, the reception device may determine the integer matrix for minimizing effective noise. For example, the integer matrix may be determined based on Equation 12 and Equation 13.

$$A = \arg\min_{\substack{A \in Z^{M_T \times M_T} \\ rank(A) = M_T}} \max_{m} \| D^{-1/2} V^T a_m \|^2$$ Equation 12

$$VDV^T = I + SNR \cdot H^T H$$ Equation 13

$M_T$ denotes the number of transmit streams, A denotes the integer matrix, m denotes transmit streams, $a_m$ denotes an m-th column of the integer matrix, V denotes an orthogonal matrix of SVD, D denotes a diagonal matrix of the SVD, SNR denotes an SNR for channel estimation, and H denotes the channel matrix. That is, the reception device may determine the integer matrix from the channel, rather than the precoding channel of Equation 8 and Equation 9.

In operation 703, the reception device may determine rates for the transmit streams based on the integer matrix. Herein, the rate may indicate an achievable transmission rate in a corresponding channel in the transmit stream transmission. The transmit stream may indicate the number of the transmit streams to be used in data transmission, that is, the number of layers of the transmission device. The reception device may determine the rates of the transmit streams, based on the integer matrix according to various algorithms. For example, the reception device may determine the rates of the transmit streams, using Cholesky decomposition. For example, the reception device may determine the rates of the transmit streams, using water filling solution.

In operation 705, the reception device may determine the number of the transmit streams, based on the rates. Based on the rates of the transmit streams, the reception device may determine how many layers (transmit streams) are operated to maximize the whole rate. In other words, the reception device may determine the number of the transmit streams, which maximizes the whole rate. For example, the reception device may determine the number of the transmit streams based on Equation 14.

$$n_s = \arg\max_{j \in \{1,2,\ldots,M\}} j \sum_{i=1}^{j} R_i$$ Equation 14

$n_s$ denotes the number of the transmit streams, $R_i$ denotes the rate of an i-th greatest transmit stream, and M denotes the number of transmit antennas. Herein, M may indicate the maximum number of the transmit streams.

For example, if $R_1=10$, $R_2=8$, $R_3=5$, and $R_4=2$, the reception device may determine the number of the transmit streams, to two.

In operation 707, the reception device may generate rank information indicating the number of the transmit streams. That is, the reception device may determine the rank indicating the number of the layers to be used by the transmission device. Herein, the rank, which is the rank of the channel, may indicate the number of streams to receive at the reception device from the transmission device through the same resource. In other words, the rank may indicate the maximum number of the streams for carrying different information over a given channel. For example, the rank information may include an RI. Based on the rank information, the reception device may recommend the number of the layers to be used by the transmission device for downlink transmission.

Although not depicted in FIG. 7, the rank may be obtained first and then the precoder may be identified. That is, the operations of the reception device for generating the rank information do not limit the operations of the reception device for generating the precoding information of FIG. 6. The reception device may determine a precoding set corresponding to the rank information. The reception device may determine the precoding set corresponding to the rank information among precoders. Since the number of the precoders to search reduces, the reception device may identify an IF precoder, to be explained, with low complexity. Namely, a search space may be reduced to one $N_T$-th of a search space of the full search. If the channel between the transmission device and the reception device is configured with a backhaul network, the search space reduces though the transmission stage and the reception stage include many antennas and thus the transmission device and the reception device may identify the IF precoder with the low complexity. The reception device may feed not only the rank information generated in operation 707 but also the precoding information indicating the IF precoder back to the transmission device.

The precoding information and the rank information have been described as the channel information fed back from the reception device to the transmission device in FIG. 6 and FIG. 7. In the following, operations of reception devices which feed the channel information back are explained with specific schemes in FIGS. 8, 9, and 10.

IF Precoding Search Scheme Using SVD

Figure 8:
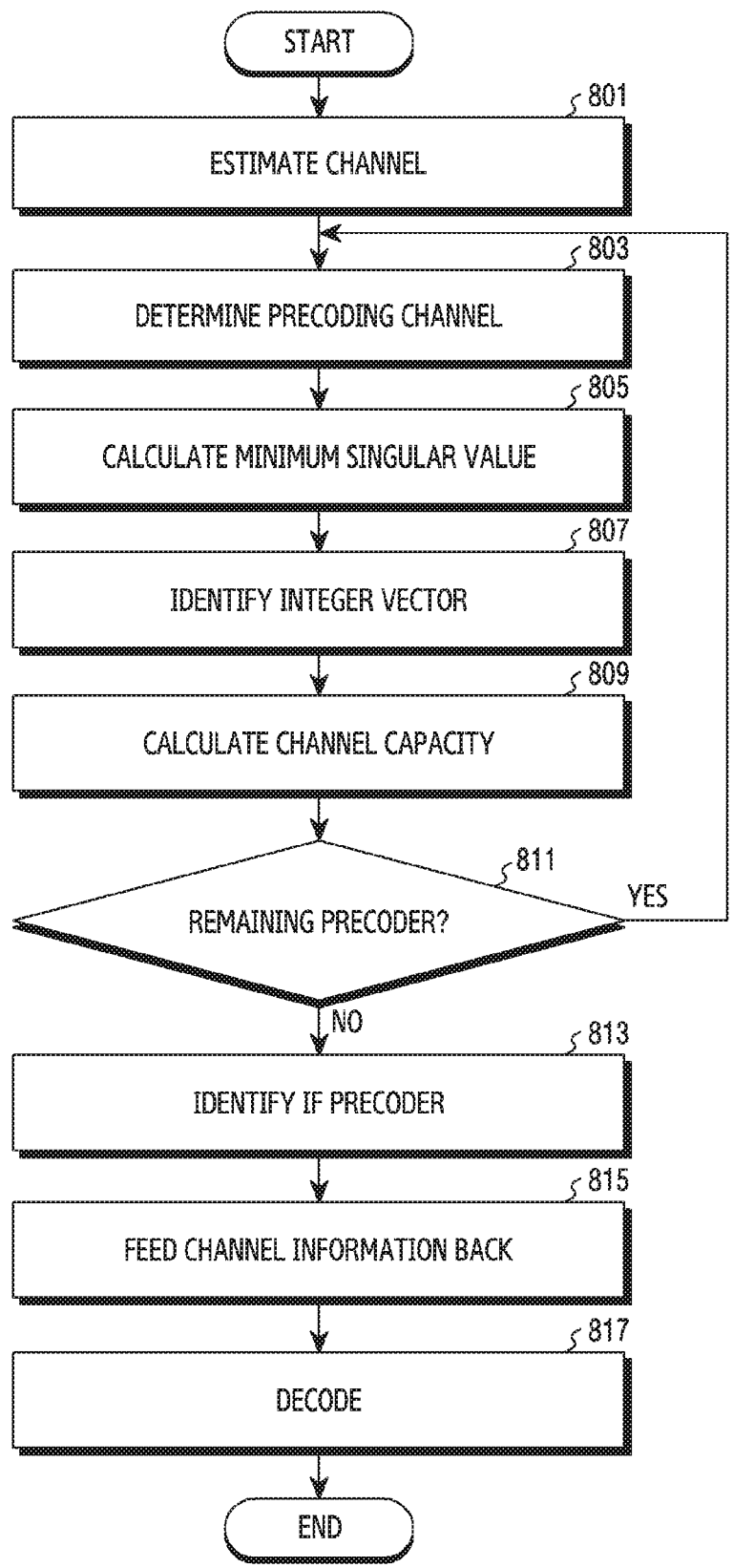
FIG. 8 illustrates a flowchart of operations of a reception device for feeding channel information back according to an embodiment of the disclosure.

FIG. 8 illustrates a flowchart of operations of a reception device for feeding channel information back according to an embodiment of the disclosure. Hereafter, the reception device represents the reception device 120 of FIG. 1.

Referring to FIG. 8, in operation 801, the reception device may estimate a channel. The reception device may estimate the channel between the transmission device and the reception device, based on an RS received from the transmission device. For example, the RS may be a CSI-RS. The reception device may determine a channel estimation result as a matrix. Namely, the reception device may determine a channel matrix. For example, the channel matrix may be H of Equation 1.

In operation 803, the reception device may determine a precoding channel. The reception device may determine a precoding set. Herein, the precoding set may include candidate precoders to be used to communicate with the transmission device. To identify an adequate precoder for the communication among the candidate precoders of the precoding set, the reception device may apply the candidate precoders to the channel estimated in operation 801. The reception device may determine the precoding channel by applying the candidate precoders to the estimated channel. For example, the reception device may determine the precoding channel by multiplying the channel matrix by the precoding matrix as expressed in Equation 7. In some embodiments, the candidate precoders may have the same rank. In some other embodiments, the candidate precoders may correspond to one of the ranks which range from 1 to the number of transmit antennas of the transmission device.

In operation 805, the reception device may calculate a minimum singular value of the precoding channel. The reception device may perform SVD on the precoding channel. Using the SVD, the reception device may determine singular values. The number of the singular values may be equal to or smaller than the number of the transmit streams. The reception device may determine the minimum singular value among the singular values. The reception device may further determine a singular vector corresponding to the minimum singular value. The singular vector may be a column vector corresponding to the minimum singular value in the orthogonal matrix of the SVD. That is, the reception device may determine a minimum eigenvector and a minimum eigenvalue for a product of the precoding channel and a transpose matrix of the precoding channel. For example, the reception device may determine the minimum eigenvector and the minimum eigenvalue based on Equation 15.

$$\overline{H}^T\overline{H} = VDV^T$$ Equation 15

$\overline{H}$ denotes the precoding channel matrix, V denotes the orthogonal matrix, and D denotes the diagonal matrix. Herein, the diagonal matrix may include eigenvalues in diagonal components. The reception device may determine the minimum eigenvalue from the eigenvalues of the diagonal components, and determine a vector corresponding to the column of the orthogonal matrix V corresponding to the minimum eigenvalue, as the minimum eigenvector.

In operation 807, the reception device may identify an integer vector. The reception device may identify the integer vector which minimizes an IF capacity. The reception device may determine the IF capacity by determining the integer vector per precoding channel, rather than determining the IF capacity by determining the full integer matrix per precoding channel. The reception device may compare performance of the precoders by calculating the integer vector only for the transmit stream expected to exhibit the worst performance, rather than calculating the IF capacity for every transmit stream.

More specifically, the transmission device may transmit the transmit streams using the same modulation and coding scheme (MCS) for sum-coding through the IF transmission/reception scheme. In so doing, the reception device feeds back the channel information based on the performance of the stream (layer) of the worst channel, due to bottleneck according to a parameter value associated with the worst channel. Hence, the reception device may be required to maximize the capacity of the worst channel, in order to enhance the channel performance. For example, in a 2×2 MIMO environment, the IF capacity calculation may be determined based on Equation 16 and Equation 17.

$$R_{IF}(H) = \min_{m=1,2} \log\left(\frac{SNR}{\sigma_{opt,m}^2}\right)$$ Equation 16

$$\sigma_{opt,m}^2 = \frac{1}{1+\lambda_{min}^2 SNR} \cdot |v_{min}^T a_m|^2 + \frac{1}{1+\lambda_{max}^2 SNR} \cdot |v_{max}^T a_m|^2$$ Equation 17

$R_{IF}(H)$ denotes the IF capacity for the channel matrix H, SNR denotes the SNR, $\lambda_{min}$ denotes a minimum value of the singular values according to the SVD, and $v_{min}$ denotes a vector (a column corresponding to $\lambda_{min}$ among columns of the orthogonal matrix) of the orthogonal matrix corresponding to $\lambda_{min}$ in the SVD. $\lambda_{max}$ denotes a maximum value of the singular values according to the SVD, and $v_{max}$ denotes a vector of the orthogonal matrix corresponding to $\lambda_{max}$ in the SVD. $a_m$ denotes the integer vector of an m-th transmit stream in the full integer matrix.

In Equation 16, as $\sigma_{opt,m}^2$ increases, the IF capacity for the transmit stream increases. That is, in the IF MIMO environment, the transmission performance may be determined according to $$\frac{1}{1+\lambda_{min}^2 SNR} \cdot |v_{min}^T a_m|^2$$

corresponding to the minimum singular value vector of the components.

Thus, the transmission device may identify the integer vector based on the minimum singular vector $v_{min}$ and the minimum singular value $\lambda_{min}$. The transmission device may identify the integer vector which minimizes $$\frac{1}{1+\lambda_{min}^2 SNR} \cdot |v_{min}^T a_m|^2.$$

Since only one vector is determined, rather than determining integer matrix for each of all of the precoders (i.e. integer matrix search), the complexity may be reduced. For example, if the codeword length is n and the total number of the precoders is $N_p$, the reception device requires $n \times N_p$-ary calculations to calculate the IF capacity. In particular, the complexity may extremely increase if the number of the layers (the number of the transmit streams) increases as in the backhaul or the size of the precoding set increases. By identifying the integer vector according to various embodiments, the reception device may identify the precoder with the reduced complexity.

In operation 809, the reception device may calculate the channel capacity. Based on the integer vector identified in operation 807, the reception device may calculate an IF effective capacity for each precoding channel. Herein, the IF effective capacity is an indicator for determining the precoder, and may be a channel capacity indicating a subchannel of the worst channel state (e.g., the lowest channel capacity). The subchannel may indicate a channel over which one transmit stream is transmitted from the transmission device to the reception device. For example, the reception device may calculate the IF effective capacity based on Equation 17 and Equation 18.

$$R_{IF,eff,i}(H) = n_s \log \frac{SNR}{\sigma_{eff,i}^2} \qquad \text{Equation 18}$$

$$\sigma_{eff,i}^2 = \frac{1}{1+\lambda_{min}^2 SNR} \cdot |v_{min}^T a_m|^2 \qquad \text{Equation 19}$$

$R_{IF,eff,i}$ denotes the IF effective capacity, $n_s$ denotes the number of columns of the precoding matrix, SNR denotes the SNR, $\lambda_{min}$ denotes the minimum value of the singular values according to the SVD, and $v_{min}$ denotes the vector of the orthogonal matrix corresponding to $\lambda_{min}$. $a_m$ denotes an integer vector regarding an m-th transmit stream in the full integer matrix.

The reception device may calculate the IF effective capacity for each precoder. By repeating operation 811, the reception device may calculate the IF effective capacities for the precoders of the precoder set.

In operation 811, the reception device may determine whether there is a remaining precoder. Herein, the remaining precoder may indicate a precoder for which the IF effective capacity is not calculated in the precoder set. In response to the precoder (the precoding matrix) requiring the IF effective capacity calculation in the precoder set, the reception device may perform operation 803. For example, if calculating the IF effective capacity for an i-th precoder in the previous operation, the reception device may calculate the IF effective capacity of an (i+1)-th precoder. In response to no precoder requiring the IF effective capacity calculation in the precoder set, the reception device may perform operation 813.

In operation 813, the reception device may identify an IF precoder. The reception device may identify the IF precoder among the precoders of the calculated IF effective capacity. In some embodiments, the reception device may identify the IF precoder of the greatest IF effective capacity.

In operation 815, the reception device may feed the channel information back. The reception device may generate the precoding information indicating the IF precoder identified in operation 813. For example, the reception device may generate the precoding information including the index indicating the IF precoder among the precoders. The reception device may determine a rank corresponding to the IF precoder. The reception device may determine the rank according to the number of the columns of the IF precoder. The reception device may generate rank information indicating the rank, that is, rank information indicating the number of streams to be transmitted by the transmission device. The reception device may transmit the channel information including at least one of the precoding information and the rank information to the transmission device.

In operation 817, the reception device may perform decoding. The reception device may receive data from the transmission device. Herein, the data may be generated and transmitted by the transmission device. The data may include the transmit streams. The transmission device may determine and transmit the transmit streams based on the channel information fed back from the reception device in operation 815.

Based on the precoding information of the channel information, the reception device may decode the received data. In some embodiments, the reception device may perform the IF decoding as shown in FIG. 4A. The reception device may conduct the IF decoding using the integer matrix corresponding to the estimated channel matrix. In some other embodiments, the reception device may decode the data using the IF detection scheme as shown in FIG. 4B.

Instead of determining the full integer matrix of high complexity, the reception device may calculate the integer vector for the transmit stream representing the channel performance, that is, for the poor channel, calculate the channel capacity, and thus identify an optimal precoder with the reduced complexity. The complexity of the reception device may be reduced by determining only the integer matrix, rather than determining the integer matrix for every precoding channel.

IF Precoding Search Scheme Using Cholesky Decomposition

Figure 9:
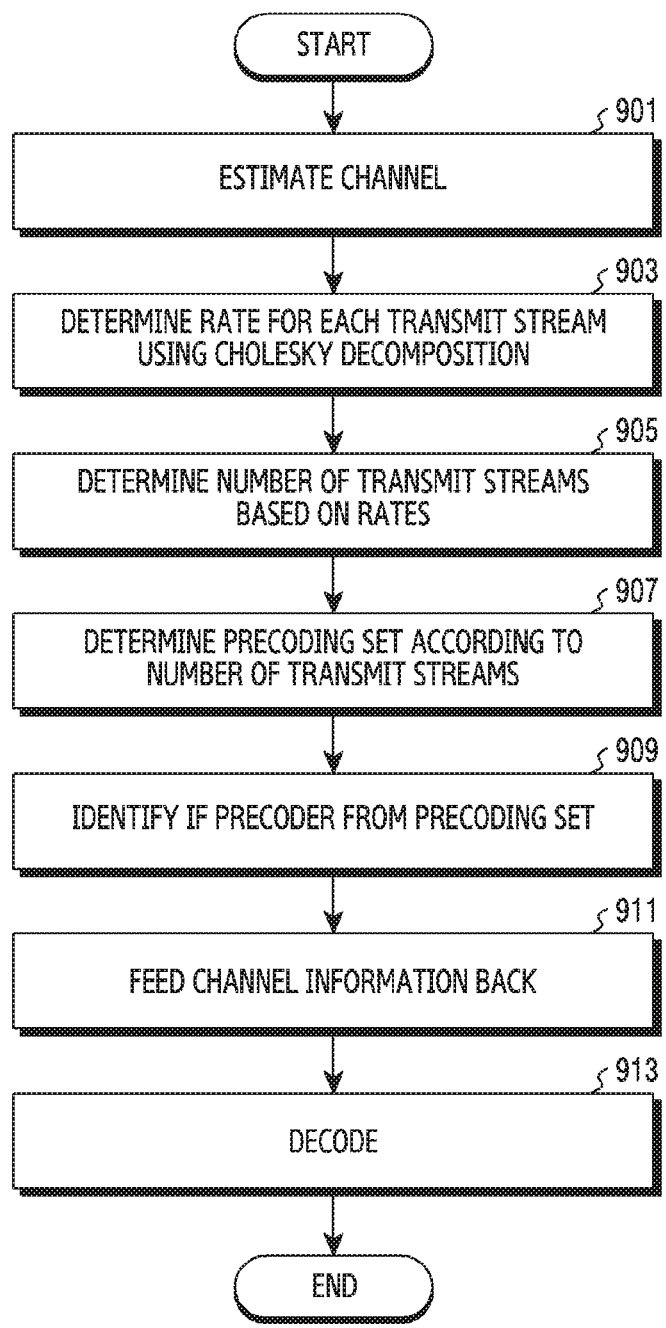
FIG. 9 illustrates another flowchart of operations of a reception device for feeding channel information back according to an embodiment of the disclosure.

FIG. 9 illustrates another flowchart of operations of a reception device for feeding channel information back according to an embodiment of the disclosure. Hereafter, the reception device represents the reception device 120 of FIG. 1. In FIG. 9, the same operations as in FIG. 8 shall be omitted in the descriptions.

Referring to FIG. 9, in operation 901, the reception device may estimate a channel. The reception device may determine a channel matrix for the estimated channel. Operation 901 corresponds to operation 801.

In operation 903, the reception device may determine a rate for each transmit stream using Cholesky decomposition. The reception device may determine an achievable rate per transmit stream, using the IF-SIC scheme. The SIC scheme may remove a decoded transmit stream component from the received signal and thus cancel interference of transmit streams to decode. Every time the SIC is performed, a size of an effective channel may decrease. The reception device may determine the obtainable rate if some transmit streams are not transmitted. That is, the reception device may determine the achievable rate according to the number of the transmit streams to transmit. Specifically, the reception device may determine the rate per transmit stream based on Equation 20 and Equation 21.

$$A \cdot (I+SNR \cdot H^T \cdot H)^{-1} \cdot A^T = L \cdot L^T \qquad \text{Equation 20}$$

A denotes the integer matrix, H denotes the channel matrix corresponding to the estimated channel, SNR denotes the SNR, and L denotes a triangular matrix of the Cholesky decomposition.

$$R_i < \frac{1}{2} \log l_{ii} \qquad \text{Equation 21}$$

$R_i$ denotes the rate for an i-th transmit stream, and $l_{ii}$ denotes an i-th element of the triangular matrix L, that is, an element indicated by an i-th column and an i-th row.

In operation 905, the reception device may determine the number of transmit streams based on the rates. The number of the transmit streams indicates the number of transmit streams to be transmitted by the transmission device according to a channel condition. The reception device may determine the suitable number of the transmit streams to achieve the rate of the whole channel. For example, the reception device may determine the number of the transmit streams based on Equation 14. The number of the transmit streams may be referred to as the number of layers or the rank of the transmission device.

In operation 907, the reception device may determine a precoding set according to the number of the transmit streams. The reception device may store information regarding a plurality of precoding sets. Herein, the precoding sets each may be a set of precoders according to a particular rank (the number of the transmit streams). That is, the precoding set may exist per the number of the transmit streams. The reception device may identify the precoding set according to the number of the transmit streams of operation 905, among the precoding sets. For example, if three transmit streams are determined in operation 905, the reception device may identify the precoding set including precoders including three columns.

In operation 909, the reception device may identify an IF precoder from the precoding set. The reception device may identify the IF precoder among the precoders of the precoding set. The reception device may identify the IF precoder based on channel capacities of the precoding channels to which the precoder is applied. In some embodiments, the channel capacity may be an IF capacity. The reception device may determine an integer matrix for each precoding channel and determine an IF capacity according to the determined integer matrix.

In some other embodiments, the channel capacity may be an IF effective capacity. The reception device may determine some constitution corresponding to an indicator for determining channel performance, that is, an integer vector, rather than determining the full integer matrix. The reception device may determine the integer vector for each precoding channel and determine the IF effective capacity according to the determined integer vector.

In operation 911, the reception device may feed channel information back. The channel information may include precoding information or rank information. The precoding information may indicate the IF precoder identified in operation 909. The rank information may indicate the number of the transmit streams determined in operation 905. Operation 911 corresponds to operation 815.

In operation 913, the reception device may perform decoding. Operation 913 corresponds to operation 817.

In FIG. 9, the reception device determines the rank information and the precoding information through the Cholesky decomposition. The reception device may determine the rate per transmit stream through the Cholesky decomposition, and determine the rank for maximizing the rate per transmit stream. By identifying the precoder after determining the rank, the reception device may identify the IF precoder with low complexity and feed the channel information back to the transmission device. Now, operations of the reception device for determining the rate per transmit stream and determining the rank through a water-filing solution are described in FIG. 10.

IF Precoder Search Scheme Using Water-Filing Solution

Figure 10:
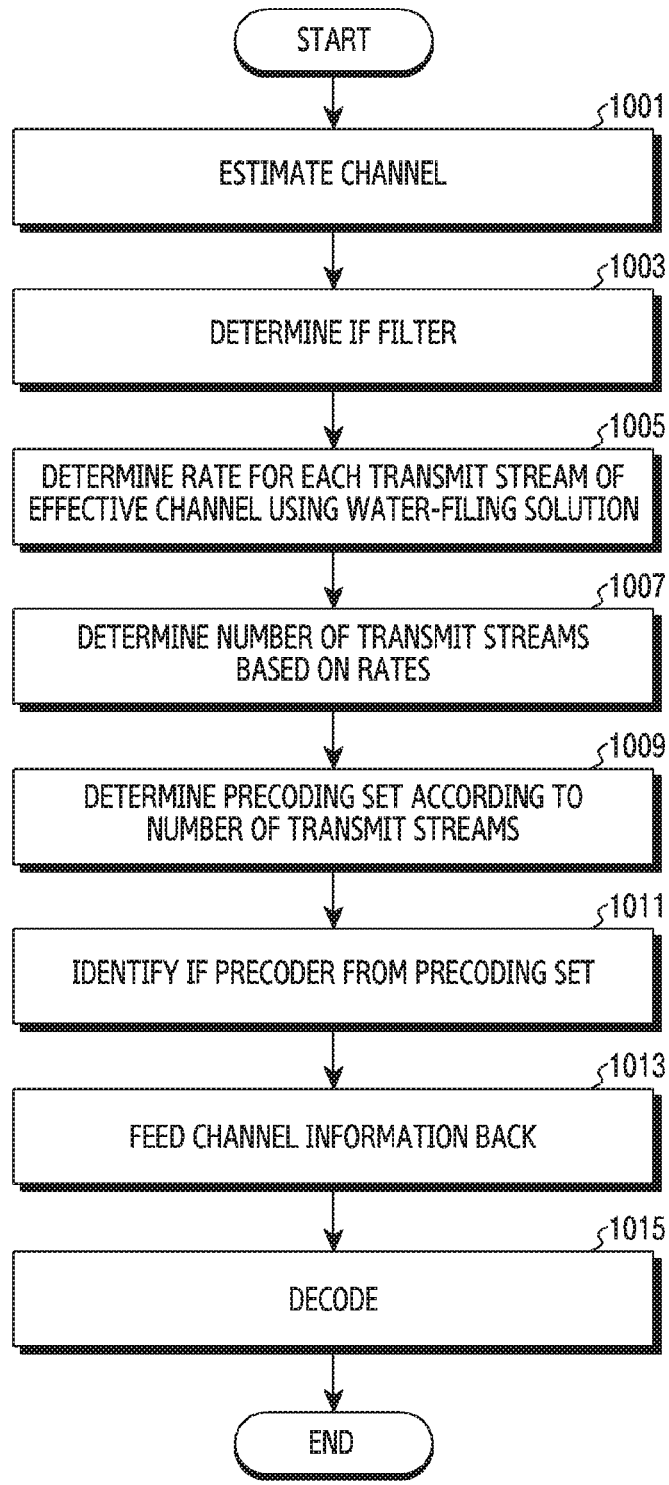
FIG. 10 illustrates yet another flowchart of operations of a reception device for feeding channel information back according to an embodiment of the disclosure.

FIG. 10 illustrates yet another flowchart of operations of a reception device for feeding channel information back according to an embodiment of the disclosure. Hereafter, the reception device represents the reception device 120 of FIG. 1. In FIG. 10, the same operations as in FIG. 9 shall be omitted in the descriptions.

Referring to FIG. 10, in operation 1001, the reception device may estimate a channel. Operation 1001 corresponds to operation 901.

In operation 1003, the reception device may determine an IF filter. The reception device may determine an equalization matrix corresponding to the IF filter. To determine the equalization matrix, the reception device may determine an integer matrix from the estimated channel. Using the IF scheme, the reception device may determine the integer matrix for maximizing a capacity for the estimated channel. The reception device may determine the equalization matrix (e.g., B of Equation 2) from the determined integer matrix. For example, the equalization matrix may be determined based on Equation 22.

$$B_{opt} = SNR \cdot A \cdot H^T \cdot (I+SNR \cdot H \cdot H^T)^{-1} \qquad \text{Equation 22}$$

$B_{opt}$ denotes the equalization matrix (the IF filter), SNR denotes the SNR, A denotes the integer matrix, and H denotes the channel matrix.

The reception device may determine a channel matrix for an effective channel, that is, an effective channel matrix based on the determined equalization matrix and the channel matrix. For example, the reception device may determine the effective channel matrix based on Equation 23.

$$\tilde{H} = B_{opt} \times H \qquad \text{Equation 23}$$

$\tilde{H}$ denotes the effective channel matrix, $B_{opt}$ denotes the equalization matrix, and H denotes the channel matrix.

For the water-filing solution to be described, using the effective channel to which the IF filter is applied, the reception device may determine the rank suitable for an achievable optimal capacity using the IF scheme.

In operation 1005, the reception device may determine a rate for each transmit stream of the effective channel, using the water-filing solution. The water-filing solution is a power allocation scheme which approaches the full transmission rate to the channel capacity by dividing the effective channel into subchannels, allocating more power to a subchannel of relatively good condition (e.g., high SNR), and allocating less power or no power to a subchannel of relatively bad condition. The subchannel may correspond to the channel of one transmit stream. If the power allocated to the subchannels of the good condition increases, the full transmission capacity may increase. By contrast, no power may be allocated to the subchannel of the bad condition. Herein, a sum of the power values allocated to the subchannels may be a fixed value.

The reception device may determine a singular value corresponding to each transmit stream by performing SVD on the effective channel. The reception device may calculate an optimal power allocation value per transmit stream, from the singular value. Some transmit streams may not be allocated the power value. As such, the reception device may calculate a maximum transmission capacity for each number of the subchannels.

In operation 1007, the reception device may determine the number of the transmit streams based on the rates. The reception device may determine the size of the full channel capacity according to the number of the subchannels. The reception device may determine the number of the subchannels when the size of the full channel capacity is the greatest, as the number of the transmit streams. In some other embodiments, the reception device may determine the number of non-zero values among the rates calculated in operation 1005, as the number of the transmit streams. In other words, the reception device may determine the rank corresponding to the number of the transmit streams having the non-zero rate.

In operation 1009, the reception device may determine a precoding set according to the number of the transmit streams. Operation 1009 corresponds to operation 907.

In operation 1011, the reception device may identify an IF precoder from the precoding set. Operation 1011 corresponds to operation 909.

In operation 1013, the reception device may feed channel information back. Operation 1013 corresponds to operation 911.

In operation 1015, the reception device may perform decoding. Operation 1015 corresponds to operation 913.

In FIG. 9 and FIG. 10, the reception device calculates the achievable transmission capacity per transmit stream, that is, the rate, and determines the number of the transmit streams. However, the Cholesky decomposition or the water-filing solution is the example for determining the rate, and the disclosure is not limited to them. That is, other schemes may be adopted to determine the number of the transmit streams (the rank).

As stated in FIG. 5 through FIG. 10, the disclosure has described the operations of the reception device (hereafter, referred to as an IF reception device) for feeding the channel information back using the IF scheme. Conventional IF schemes consider transmission of streams to a full layer when the transmission device does not perform the precoding. However, according to various embodiments, communication performance between the transmission device and the reception device may be improved by determining the rank or the precoder suitable for the IF scheme. In addition, by reducing the number of times of determining the integer matrix, the complexity of the IF reception device may be reduced. Since considerable streams are transmitted/received in the backhaul communication, efficient backhaul communication performance may be satisfied.

In the disclosure, the reception device estimates the channel, generates the channel information based on the estimated channel, and feeds the generated channel information back to the transmission device. However, in some embodiments of the disclosure, the operations for determining the channel information (e.g., determining the IF precoder, determining the rank) may be fulfilled by the transmission device. For example, the reception device may transmit the RS. The transmission device may estimate the channel, generate the channel information based on the estimated channel, and transmit data without separate feedback.

As set forth above, the apparatus and the method according to various embodiments of the disclosure may feed the channel information acquired using the IF scheme, back and thus efficiently receive the signal using the IF scheme.

The methods according to the embodiments described in the claims or the specification of the disclosure may be implemented in software, hardware, or a combination of hardware and software.

If implementing in software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable read only memory (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. Also, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. The storage device may access the device which implements the embodiment of the disclosure through an external port. Also, a separate storage device may access the device which implements the embodiment of the disclosure over the communication network.

In the specific embodiments of the disclosure, the elements included in the disclosure are expressed in a singular or plural form according to the specific embodiment. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a first apparatus in a communication system, comprising:
    obtaining a precoding channel by using a corresponding precoder of precoders and a channel between the first apparatus and a second apparatus;
    obtaining a minimum singular value of the precoding channel and a singular vector corresponding to the minimum singular value, by using single value decomposition (SVD) to the precoding channel; and identifying one integer column vector among columns of an integer matrix obtained by applying an integer forcing (IF) to the precoding channel, based on the minimum singular value and the singular vector without another singular value and another singular vector, wherein each element of the integer matrix corresponds to an integer value;

obtaining an IF capacity for the corresponding precoder by using the identified one integer column vector;

identifying a precoder among the precoders based on an IF capacity for each of the precoders; and transmitting channel state information including information indicating the precoder to the second apparatus.

2. The method of claim 1,
wherein the one integer column vector is identified among the columns of the integer matrix to minimize on the following equation, $$\frac{1}{1+\lambda_{min}^2 SNR} \cdot |v_{min}^T a_m|^2$$

where $\lambda_{min}$ denotes the minimum singular value of the precoding channel, $v_{min}$ denotes the singular vector of the precoding channel, SNR denotes a signal-to-noise ratio (SNR), and $a_m$ denotes an integer column vector corresponding to an m-th transmit stream among the columns of the integer matrix.

3. The method of claim 1, wherein the transmitting of the channel state information comprises:
obtaining a number of transmit streams, based on the integer matrix and a rate of each transmit stream; and
generating the channel state information including rank information for indicating the number of the transmit streams.

4. The method of claim 3, wherein a rate for an i-th transmit stream of the transmit streams is obtained based on the following equations, $$A \cdot (I+SNR \cdot H^T \cdot H)^{-1} \cdot A^T = L \cdot L^T$$

where A denotes the integer matrix, H denotes a channel matrix of the channel, SNR denotes a signal-to-noise ratio (SNR), and L denotes a triangular matrix of Cholesky decomposition, and $$R_i < \frac{1}{2} \log l_{ii}$$

where $R_i$ denotes the rate for the i-th transmit stream, and $l_{ii}$ denotes an i-th element of the triangular matrix L, that is, an element indicated by an i-th column and an i-th row.

5. The method of claim 3, wherein the generating of the channel state information comprises:
obtaining an IF-filter matrix based on the integer matrix; and
obtaining the rate of each transmit stream by applying a water filing technique to an effective channel applied with the IF-filter matrix.

6. The method of claim 3, wherein the generating of the channel state information further comprises:
identifying the precoders among a plurality of precoder sets based on the rank information.

7. A first apparatus in a communication system, comprising:

at least one transceiver; and
at least one processor operatively coupled to the at least one transceiver and configured to:
obtain a precoding channel by using a corresponding precoder of precoders and a channel between the first apparatus and a second apparatus;
obtain a minimum singular value of the precoding channel and a singular vector corresponding to the minimum singular value, by using single value decomposition (SVD) to the precoding channel; and
identify one integer column vector among columns of an integer matrix obtained by applying an integer forcing (IF) to the precoding channel, based on the minimum singular value and the singular vector without another singular value and another singular vector, wherein each element of the integer matrix corresponds to an integer value;
obtain an IF capacity for the corresponding precoder by using the identified one integer column vector,
identify a precoder among the precoders based on an IF capacity for each of the precoders; and
control the at least one transceiver to transmit channel state information including information indicating the precoder to the second apparatus.

8. The first apparatus of claim 7,
wherein the one integer column vector is identified among the columns of the integer matrix to minimize the following equation, $$\frac{1}{1+\lambda_{min}^2 SNR} \cdot |v_{min}^T a_m|^2$$

where $\lambda_{min}$ denotes the minimum singular value of the precoding channel, $v_{min}$ denotes the singular vector of the precoding channel, SNR denotes a signal-to-noise ratio (SNR), and $a_m$ denotes an integer column vector corresponding to an m-th transmit stream among the columns of the integer matrix.

9. The first apparatus of claim 7, wherein, to transmit the channel state information, the at least one processor is further configured to:
obtain number of transmit streams based on the integer matrix and a rate of each transmit stream; and
generate the channel state information including rank information for indicating the number of the transmit streams.

10. The first apparatus of claim 9, wherein a rate for an i-th transmit stream of the transmit streams is obtained based on the following equations, $$A \cdot (I+SNR \cdot H^T \cdot H)^{-1} \cdot A^T = L \cdot L^T$$

where A denotes the integer matrix, H denotes a channel matrix of the channel, SNR denotes a signal-to-noise ratio (SNR), and L denotes a triangular matrix of Cholesky decomposition, and $$R_i < \frac{1}{2} \log l_{ii}$$

where $R_i$ denotes the rate for the i-th transmit stream, and $l_{ii}$ denotes an i-th element of the triangular matrix L, that is, an element indicated by an i-th column and an i-th row.

11. The first apparatus of claim 9, wherein, to generate the channel state information, the at least one processor is further configured to:
- obtain an IF-filter matrix based on the integer matrix, and
- obtain the rate of each transmit stream by applying a water filing technique to an effective channel applied with the IF-filter matrix.

12. The first apparatus of claim 9, wherein, to generate the channel state information, the at least one processor is further configured to:
- identify the precoders corresponding to the rank information among a plurality of precoder sets.

* * * * *